United States Patent
Williams et al.

(10) Patent No.: US 10,210,870 B2
(45) Date of Patent: *Feb. 19, 2019

(54) METHOD FOR VERIFICATION AND BLACKLIST DETECTION USING A BIOMETRICS PLATFORM

(71) Applicant: Verint Americas Inc., Alpharetta, GA (US)

(72) Inventors: Jamie Richard Williams, Fleet (GB); Robert John Barnes, Watford (GB); Ian Linsdell, Roswell, GA (US); Scott M. Bluman, Atlanta, GA (US)

(73) Assignee: VERINT AMERICAS INC., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/825,151

(22) Filed: Nov. 29, 2017

(65) Prior Publication Data

US 2018/0190296 A1 Jul. 5, 2018

Related U.S. Application Data

(63) Continuation of application No. 15/161,342, filed on May 23, 2016, now Pat. No. 9,858,931, which is a (Continued)

(51) Int. Cl.
*G10L 15/00* (2013.01)
*G10L 15/02* (2006.01)
(Continued)

(52) U.S. Cl.
CPC ............ *G10L 17/06* (2013.01); *G10L 17/005* (2013.01); *G10L 17/04* (2013.01); *G10L 25/51* (2013.01);
(Continued)

(58) Field of Classification Search
USPC ............................................. 704/7, 200–275
See application file for complete search history.

(56) References Cited

U.S. PATENT DOCUMENTS

| 8,095,372 B2 | 1/2012 | Kuppuswamy et al. |
| 8,566,904 B2 | 10/2013 | Pizano et al. |

(Continued)

*Primary Examiner* — Marcellus Augustin
(74) *Attorney, Agent, or Firm* — Meunier Carlin & Curfman

(57) ABSTRACT

Systems and methods for analyzing digital recordings of the human voice in order to find characteristics unique to an individual. A biometrics engine may use an analytics service in a contact center to supply audio streams based on configured rules and providers for biometric detection. The analytics service may provide call audio data and attributes to connected engines based on a provider-set of selection rules. The connected providers send call audio data and attributes through the analytics service. The engines are notified when a new call is available for processing and can then retrieve chunks of audio data and call attributes by polling an analytics service interface. A mathematical model of the human vocal tract in the call audio data is created and/or matched against existing models. The result is analogous to a fingerprint, i.e., a pattern unique to an individual to within some level of probability.

14 Claims, 12 Drawing Sheets

Related U.S. Application Data continuation of application No. 14/213,535, filed on Mar. 14, 2014, now Pat. No. 9,349,373.

(60) Provisional application No. 61/783,142, filed on Mar. 14, 2013, provisional application No. 61/781,915, filed on Mar. 14, 2013.

(51) Int. Cl.

| | | |
|---|---|---|
| *G10L 15/20* | (2006.01) | |
| *G10L 17/06* | (2013.01) | |
| *H04M 3/493* | (2006.01) | |
| *G10L 17/00* | (2013.01) | |
| *G10L 17/04* | (2013.01) | |
| *G10L 25/51* | (2013.01) | |
| *H04M 3/51* | (2006.01) | |
| *H04M 3/42* | (2006.01) | |

(52) U.S. Cl.
CPC ....... *H04M 3/4936* (2013.01); *H04M 3/5166* (2013.01); *H04M 3/42221* (2013.01); *H04M 2201/41* (2013.01); *H04M 2203/551* (2013.01); *H04M 2203/6045* (2013.01); *H04M 2203/6054* (2013.01)

(56) References Cited

U.S. PATENT DOCUMENTS

| | | | |
|---|---|---|---|
| 8,887,269 B2 | 11/2014 | Teglia | |
| 9,349,373 B1* | 5/2016 | Williams | ............ H04M 3/4936 |
| 2007/0041517 A1* | 2/2007 | Clarke | .................... H04M 1/67 |
| | | | 379/67.1 |
| 2007/0106517 A1 | 5/2007 | Cluff et al. | |
| 2010/0086108 A1 | 4/2010 | Jaiswal et al. | |
| 2010/0121644 A1 | 5/2010 | Glasser | |
| 2011/0141276 A1* | 6/2011 | Borghei | ................ H04W 12/08 |
| | | | 348/143 |
| 2012/0072453 A1 | 3/2012 | Guerra et al. | |
| 2012/0249328 A1 | 10/2012 | Xiong | |
| 2014/0007210 A1 | 1/2014 | Murakami et al. | |
| 2014/0214676 A1* | 7/2014 | Bukai | .................... G06Q 20/12 |
| | | | 705/44 |
| 2015/0055763 A1* | 2/2015 | Guerra | ................... G06Q 50/01 |
| | | | 379/88.02 |
| 2015/0381801 A1* | 12/2015 | Rajakumar | ............. G10L 25/48 |
| | | | 379/88.01 |

\* cited by examiner

METHOD FOR VERIFICATION AND BLACKLIST DETECTION USING A BIOMETRICS PLATFORM

CROSS-REFERENCE TO RELATED APPLICATION

This application is a continuation of U.S. patent application Ser. No. 15/161,342, filed May 23, 2016, entitled "Biometrics Platform," which is a continuation of U.S. patent application Ser. No. 14/213,535, filed Mar. 14, 2014, entitled "Biometrics Platform," now U.S. Pat. No. 9,349,373, and claims priority to U.S. Provisional Application Nos. 61/781,915, filed Mar. 14, 2013, entitled "Recording Infrastructure Having biometrics engine and analytics service," and 61/783,142, filed Mar. 14, 2013, entitled "Biometrics Platform," each of which is incorporated herein by reference in its entirety.

BACKGROUND

Security is has become increasingly important as it relates to authentication of customers who interact with contact centers. Almost every retailer and financial institution offers multiple mechanisms by which customers may contact them. These include email, on-line, telephone, chat, text, social media and other. The security community has long sought a viable, relatively easy to implement security factor to supplement and fortify passwords and other identification information (e.g., a person's address, last four of a person's social security number, birthdates, etc) as a means for user authentication. Previous attempts have been hamstrung by solutions that are too expensive and cumbersome to enjoy mainstream adoption.

SUMMARY

Systems and methods for analyzing digital recordings of the human voice in order to find characteristics unique to an individual. A biometrics engine may use an analytics service in a contact center to supply audio streams based on configured rules and providers for biometric detection. The analytics service may provide call audio data and attributes to connected engines based on a provider-set of selection rules. The connected providers send call audio data and attributes through the analytics service. The engines are notified when a new call is available for processing and can then retrieve chunks of audio data and call attributes by polling an analytics service interface. A mathematical model of the human vocal tract in the call audio data is created and/or matched against existing models. The result is analogous to a fingerprint, i.e., a pattern unique to an individual to within some level of probability.

In accordance with an aspect of the present disclosure, there is disclosed a method for providing a biometrics platform. The method includes providing at least one provider that receives and processes audio data; providing an analytics service that receives the audio data from the at least one provides; providing a person database that stores voiceprints that are each uniquely associated with a person; and providing a biometrics engine that creates voiceprints and compares audio data to voiceprints stored in the person database.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present disclosure is described with reference to the accompanying drawings. In the drawings, identical reference numbers indicate identical or functionally similar elements.

DETAILED DESCRIPTION

Overview of Biometrics

Figure 1:
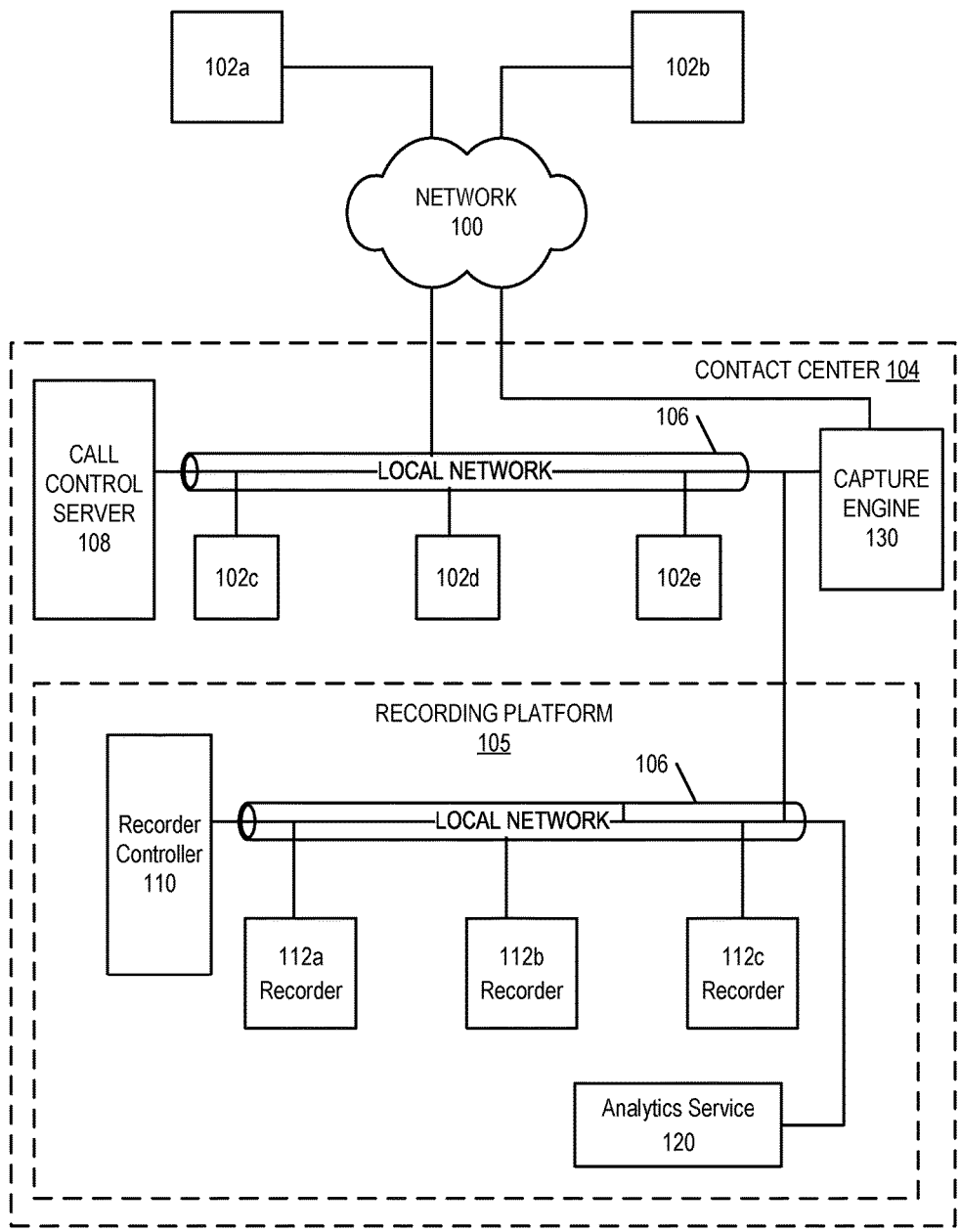
FIG. 1 is an exemplary embodiment of a network configuration for recording a communication between a customer and a contact center.

Computer systems typically identify people by using one or more general types of information. The first is something the person knows (e.g. a password), the second is something a person has (e.g. an RFID chip embedded in a token of some form), and the third is something a person is. A biometric measurement is any form of data that can be used to provide this third type of authentication. Well-known examples include fingerprints, DNA 'fingerprints', and iris or retinal scans.

Certain factors that determine when a specific biometric may be useful include the cost of the equipment required to measure it and the level of inconvenience required to measure it, relative to the level of security required. Accuracy is another factor, e.g., can the biometric equipment reliably distinguish different individuals or can the biometric equipment reliably recognize a single individual? Other factors include the speed of measurement and legal issues, e.g., it is often illegal to take and/or store a DNA fingerprint without the consent of the individual.

With respect to voice biometrics, this involves analyzing digital recordings of the human voice in order to find characteristics unique to an individual. This may be performed by creating a mathematical model of the human vocal tract and matching it against the audio recording. Typically, this involves analyzing the patterns of resonant frequencies produced as a result of the shape of the vocal tract, during both consonantal sounds and vowel sounds. The result is analogous to a fingerprint, i.e., a pattern unique to an individual to within some level of probability.

Voice biometrics have certain characteristics, such as they do not require special hardware to read; all that is needed is a way of recording the voice, which just requires a microphone (e.g., such as those built into every telephone). Voice biometrics are non-invasive and passive, e.g., all that is needed is to record a conversation. To within a usual statistical variation, a voiceprint is permanent once an individual reaches physical maturity. Children who are still growing have voiceprints that change beyond normal statistical variation over time. Voiceprints may be used to distinguish close family members, even identical twins. Voiceprints are independent of the language spoken, and of high-level features such as accent, pitch, and gender. This also means voiceprints are largely orthogonal to the features used by human listeners to identify speech, which means that combining human listening and the automated voice biometric is much more effective than either alone.

Voiceprints show a reasonable level of statistical variation for any given individual. A typical "equal error rate" is approximately 0.05 (5%). While more accurate biometrics such as DNA exhibit several orders of magnitude more accuracy, they require specialized equipment, as noted above. Therefore, voice biometrics may be augmented with other techniques when security requirements are high. However, voice biometrics are difficult to counterfeit, i.e., it is hard to alter a voice to make it produce a voiceprint similar to someone else's, if the aim is to impersonate that person.

Example Network Configuration

FIG. 1 is an exemplary embodiment of a network configuration for recording a communication between a customer and a contact center. More specifically, as illustrated in the non-limiting example of FIG. 1, communications devices 102a, 102b may be coupled to a network 100. The communications devices 102a, 102b may be IP-based telephones, Public Switched Telephone Network (PSTN) based telephones, mobile phones, VoIP phones, and/or SIP-based telephones. Additionally, the network 100 may include one or more networks, such as a PSTN, an IP network (such as the Internet, an Intranet, etc.), a cellular network (GSM, CDMA, 3G, 4G, LTE), an ISDN, and/or other networks.

Also coupled to the network 100 is a contact center 104 that may be coupled to the network 100 via local network 106; however, this is not a requirement. The contact center 104 may be configured to provide customer service to users on communications devices 102a, 102b via agents on communications devices 102c, 102d, and/or 102e. Also coupled to the local network 106 is a call control server 108, which may be configured to receive a communication and determine where to route the receive communication. The call control server 108 may also include other logic for facilitating communications with the contact center 104.

A capture engine 130 may consolidate receiving and recording various types of communication signals into a recording platform 105. The capture engine 130 may include various types of communication interfaces that facilitate receiving and recording various types of communication signals. For example, the capture engine 130 may include a media channel framework which includes an E1/T1 trunk tap interface, A/D extension tap interface, TDM terminated interface, screen capture interface, voice over IP (VoIP) filter interface and local storage interface. The E1/T1 trunk tap interface can communicate with an AiLogics and Intel E1/T1 tap; the A/D extension tap interface can communicate with an AiLogics digital/analog passive tap; and the TDM terminated interface can communicate with an AiLogics and Intel E1/T1 terminated. The screen capture interface can communicate with software running on the agent's desktop (e.g., communications devices 102c, 102d, and/or 102e), the IP Terminated interface can communicate with an SIP extension; the VoIP filtering interface can decode with a SCCP, SIP, or other similar protocol; and network cards (not shown) can receive 32-bit and 128-bit communication format. The capture engine 130 may tag "recordings, current or past, with specified data. These data fields ultimately form part of a recording's call detail record and can later be used to search for it.

Also coupled to the local network 106 is a recording platform 105. The recording platform 105 may have one or more recorder controllers 110 (although only one is shown). The recorder controller 110 may include recording logic, such as routing logic for receiving data related to a communication and determining which recorder 112a, 112b, and/or 112c to send the data for recording. The recorders 112a, 112b, and 112c may be configured to record data associated with a communication among the communications devices 102a-e.

The recording platform 105 may also include an analytics service 120. The analytics service 120 is described in greater detail below, but generally provides a mechanism to plug-in analytics engines such as keyword spotting, biometrics and speech transcription. The analytics service 120 is a recorder platform-based service responsible for obtaining real-time or post-processing data and managing plug-in analytics engines. For example, a biometrics engine may provide voiceprint detection.

As will be described, voiceprints of callers may be stored, where the callers are both authorized and unauthorized. A voiceprint may be used with reference to a speaker model representing the unique characteristics of an individual's voice, and/or a language model representing linguistic characteristics of the speaker. The voiceprint may include a collection of features that are extracted from an audio signal, of the individual's voice, and encoded within a specific statistical framework. In various embodiments, these features include cadence, tone, rate of speech, spectral characteristics, and/or other descriptive information about the voice and vocal track of the speaker that describes the speaker (separately from the words spoken). Other synonyms for a voiceprint may include, but are not limited to, a voice signature, a voice model, speaker model, a voice portion of a speaker model, and also in some instances, simply a speaker voice. Additionally, audio information or data may be extracted from call audio data including both speaker models that represent the voice of a speaker and channel models that represent a communication profile of an audio path for a channel used by the speaker. The communications profile may include noise models, background noise, transfer path functions, as well as other representative characteristics that may be determined for a communications channel that would be known to one of ordinary skill in the art. Voiceprints from multiple institutions may be shared among contact centers 104 such that each individual contact center 104 gains the benefit of a larger database of authorized or unauthorized callers.

Figure 2:
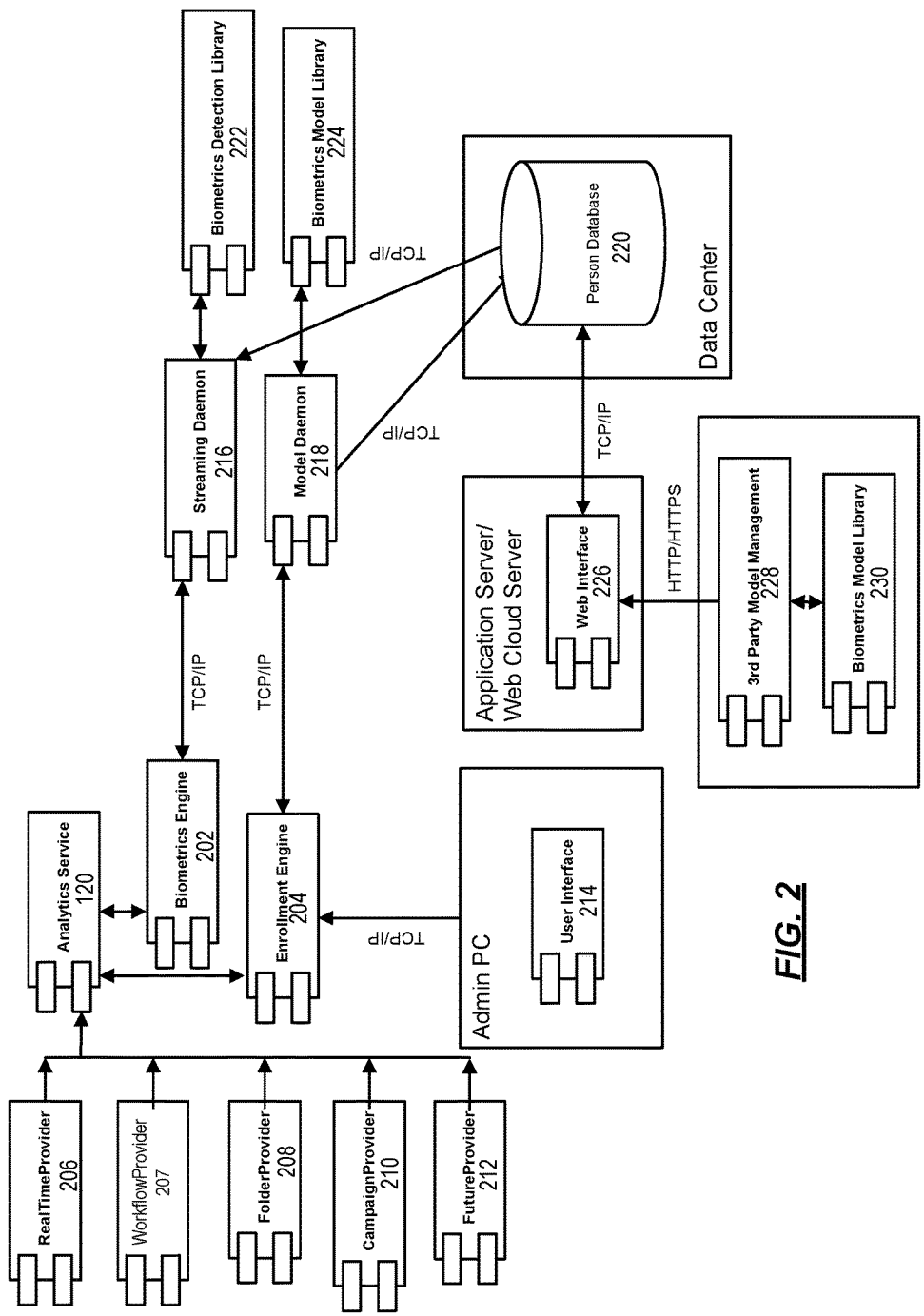
FIG. 2 illustrates an example biometrics framework.

Referring now to FIG. 2, there is illustrated an example biometrics framework 200. A biometrics engine 202 may use the analytics service 120 to supply audio streams based on configured rules and providers 206, 207, 208, 210 and 212 to a detection library 222 and model library 224 for biometric detection. The analytics service 120 may be designed to provide call audio data and attributes to connected engines (202, 204) based on a provider-set of selection rules. The engines connect to the analytics service 120 to register their interest in a set of selection rules for a specific Provider. The connected providers (e.g., 206-212) then send call audio data and attributes through the analytics service 120, which may buffer the data and then forwards it to the connected engines (e.g., 202-204). The engines are notified when a new call is available for processing and can then retrieve chunks of audio data and call attributes by polling an analytics service interface.

The biometrics engine 202 registers its interest in call audio and attributes for a specific provider 206, 207, 208, 210 or 212 and set of selection rules. The biometrics engine 202 then interleaves audio chunks from multiple calls into a single stream and sends it over a single network socket to a streaming daemon 216. The biometrics engine 202 also receives biometric detection results from the streaming daemon 216 and calls the appropriate analytics service interface methods to tag a call or notify a user of biometric detection.

A user interface (UI) 214 may be provided at an administrative computing device to provide an interface to manage people, their attributes, voiceprint models and groups of validation or blacklist people to be used by biometric detection. The user interface 214 also provides reporting and analysis tools for interpreting biometric detection results.

The user interface 214 may also be provided for manipulating voiceprint models, managing groups of people for biometric detection, displaying full auditing and viewing/analyzing biometric results. The biometrics framework may include streaming and model management interface components (e.g., streaming daemon 216 and model daemon 218) to the detection library 222 and the model library 224. Interfaces and adapters may be provided so that different third party biometric detection, model management libraries versions or vendors may be used with minimal effort compared to having to re-write entire biometrics framework 200.

Through the user interface 214, it is possible to manually add/update/delete a person and their attributes in a person database 220. Multi-selection and filtering of people is available. It is possible to create/update/delete custom attributes and their values associated with people in the person database 220. The custom attributes should include an additional display friendly text for the user interface 214. Manual assignment of one or more audio WAV files to a person may be performed, with any necessary audio format conversion performed by the biometrics framework 200.

Audio files may be uploaded to a biometrics server (not shown) via the user interface 214. When a voiceprint model is created/updated, the biometric engine 202 and version that produced the model will be stored along with the model, this will provide for support of multiple engines and determine which one to use for the comparison in addition to allow for backwards compatibility of the voiceprints between versions at some point.

Groups of people may be created/updated/deleted for either Person Validation, Black List detection or both. These groups will be able to be enabled or disable for inclusion in Biometric detection as needed. It will be possible to 'auto enroll' people and their attributes using a set of configured person ID's and attributes from any analytics connected providers.

Once voiceprint models are created and stored, a level of management of the models is provide by the framework 200. This affects both the person database 220, which stores sufficient information about the models, and the user interface 214 for managing the models. The user interface 214 provides the ability to perform tasks such as looking at person database 220 records and see if there is a voiceprint model for them; showing the number of calls and duration of audio used to create the voiceprint; and displaying metadata for the calls used to create a voiceprint. The user interface 214 allows calls used to create a voiceprint to be replayed; allows the list of calls used to generate a voiceprint to be manipulated (removing calls; maybe also searching for, replaying, and adding new calls) and the voiceprint regenerated; and deleting a voiceprint In order to accomplish these tasks, the user interface 214 communicates with the person database 220 via, e.g., a Web Service to retrieve calls for replay. There may be a need to purge voiceprints via the application of some form of rules, such as when a voiceprint reaches a certain age without being augmented with new audio, or maybe without being accessed. Voiceprints may be purged when the related person ceases to be of interest, e.g., if a customer account is closed, or an agent leaves. Voiceprints may be purged on-demand based upon some external input (such as it being manually identified that the calls used to create the model were not of the right speaker).

Providers 206, 207, 208, 210 and 212 are responsible for obtaining the selection rule information, metadata, and audio data for calls that need to be analyzed, and processing metadata results and actions, as noted above. Each may perform these tasks in a different way. The framework 200 creates 'instances' of each provider as required, e.g., for most providers, one instance is created for each selection rule. Each instance can be separately configured, started, and stopped.

An enrollment engine 204 may perform manual enrollment via network commands from the user interface 214 or auto enrollment by registering its interest in call audio and attributes for a specific provider 206, 207, 208, 210 or 212 and set of selection rules. An enrollment process defines which audio is used and how it is used from a person (customer/agent/other) to create a biometrics voiceprint model which uniquely identifies them. The person's audio is typically captured when calls occur into or out of the contact center 104. The person's model is then later used by the system to detect the person and perform various system actions. Each person's model can have a weighted value associated with it, indicating the models quality, authenticity and uniqueness within the system, this weighted model value can then be used later in the detection process for the system to decide what actions it should take.

For auto enrollment, the enrollment engine 204 then requests audio in a specific format suitable for person voiceprint enrollment. For manual enrollment, the enrollment engine 204 performs any necessary audio format conversation. The enrollment engine 204 then interleaves audio chunks from multiple audio streams into a single stream and sends over a single network socket to the model daemon 218. Along with the audio data, the enrollment engine 204 sends a person's unique enrollment_id, attributes and attribute values so that the person can be automatically inserted or updated in the Person database 220.

The person database 220 contains person attributes and model details for biometric detection. The person database 220 may be any SQL-compliant database that stores person and associated attribute details along with person voiceprint model. In a system using voiceprint biometrics, the voiceprint files are indexed by the identity of the person to whom they belong. In order to provide the ability to match voiceprint models to speakers, whether agents or customers, the person database 220 stores relevant information about possible speakers. This may include items such as: name, telephone number(s), gender, language(s) spoken and/or specific identifying information (e.g. customer account number).

Along with metadata about each individual, the person database 220 also stores information specific to voiceprints. This includes whether there is a voiceprint model at all for the individual, how many calls were used to create the voiceprint, and how much audio (duration) was used to create the voiceprint. The voiceprints in the person database 220 are readily accessible by components in biometric framework 200 that use the voiceprints for comparisons. If the voiceprint files are sufficiently small, it may be possible to store them directly in the person database 220, or they can be stored on a file system with some method for determining the file path and name from the corresponding agent or customer ID.

In accordance with some implementations, voiceprints may be encrypted. A voiceprint does not enable reconstruction of any of the audio from which it was created, and thus raises no issues around areas like PCI standards; however, it is likely that specific users may require that voiceprints are encrypted, or that legislation requiring encryption of them may be enacted. This can be achieved using a generic Secure File Interface (SFI) subsystem already used for encryption of other files in the Recorder.

The streaming daemon 216 may be a component that receives biometric detection commands and data from the biometrics engine 202 and that performs an action to select a person model based on attributes and associated attributes in the person database 220. The streaming daemon 216 handles requests for selecting voiceprint models based on person attributes and processing using the configured biometric detection library 224. The streaming daemon 216 provides call attribute collation with biometric detection results when using pre-recorded calls with attributes in XML files. The streaming daemon 216 may also auto enrolls person details and their attributes into the person database 220. The streaming daemon 216 sends audio data and selected voiceprint models to the biometric detection library 222. When a biometric detection library call back method notifies the streaming daemon 216 of a biometric detection, it passes the results back to the biometric engine 202 as well as inserting/updating the results in the person database 220.

The model daemon 218 is a component that receives enrollment commands and data from the enrollment engine 204 and performs necessary action to either insert/update person and their attributes in the person database 220 or creates/enhance person model from audio data using third party biometric model library.

The biometrics detection library 222 may be a component that is a third party library used to perform biometric detection and return results to the streaming daemon 216 for given audio data and voiceprint model selection. A biometrics model library 224 component that is a third party library used to create/enhance a person voiceprint model. In accordance with some implementations, the person model database may be exposed using APIs (via a web interface 226) so that third party vendors may retrieve and update person models and their attributes using a third party model management interface 228 and biometrics model interface 230. Since the person model web interface API will not have to perform any audio conversion or biometrics voiceprint model file enhancement/generation itself, it should be a relatively simple matter of providing a CRUD web interface around the person database 220.

In the biometrics framework 200, the interfaces between the various components may be TCP/IP connections. The TCP/IP may either command ports or data ports. Command ports are used for sending commands and returning biometric results. For example, this connection is established from the biometrics engine 202 and the streaming daemon 216. Data ports are used to send interleaved chunks of audio data as well as to notify the biometrics engine 202 when the streaming daemon 216 does not require any more data for a specific call. APIs may expose interfaces of detection library 222 or for querying/creating/updating/deleting person voiceprint models in the person database 220 via a web service.

General Voiceprint Creation

Below is described an example voiceprint creation process, which begins with audio in, e.g., a 16-bit linear PCM format. The biometrics framework 200 may also handle G.711 audio (A-law or μ-law), but any other transcoding may be performed. This input can be mono or stereo. The speech should be at least 10 dB louder than the background noise.

1. Voice Activity Detection (VAD): The audio is analyzed and the sections that have actual speech are identified, ignoring sections containing silence, noise, or non-speech sounds such as DTMF tones. A typical conversation is usually split into roughly equal thirds between the two speakers and discarded non-speech audio.

2. Feature Extraction: An MFCC (Mel-Frequency Cepstrum Coefficient) model may be created for the speech. The speech is broken into 20 ms sections, with the sections overlapping by 10 ms, and a Fast Fourier Transform is applied. The result is a set of 19 coefficients plus 19 differential coefficients, thus giving a point in a 38-dimensional space.

3. Diarization: Where needed, the audio in a channel is analyzed to separate multiple speakers.

4. Quality Measures: At this point, an analysis is performed to ensure that the audio is good enough for further analysis. Audio with a signal-to-noise ratio less than 10 dB may be rejected. Also, creating a model voiceprint should be created from, e.g., 30 seconds of net speech, while a test voiceprint may be created from, e.g., 7 seconds of net speech.

5. Feature Normalization: The 38 coefficients are normalized by a CMS (Cepstral Mean Subtraction) process, which 're-centers' them. Then, the values are passed through a RASTA filter to reduce long-term variability, and are 'warped' to map them to a Gaussian distribution. These steps tend to remove artifacts resulting from the source 'channel,' such as the compression applied for VoIP or mobile phone transmission.

6. STATS creation: The data is now compared to a UBM (Universal Background Model), which is a set of 1024 GMMs (Gaussian Mixture Models), and the differences are kept. This produces the base voiceprint, which is a set of 38×1024 4-byte values, total size 152 KB. This may be compressed into a STATS file of less than 8 kB.

7. Model Voiceprint Creation: When creating a new model voiceprint for future use, there is one more step applied to the STATS file. This involves projecting the remaining 38-dimensional vector onto two separate planes, one of which represents the truly speaker-specific part of the voiceprint; the other represents features which are not useful and are typically characteristic of the original source instead. The resultant data is then compressed down to a typical size of just 1.8 kB.

The model voiceprint produces better results when used later if the audio used to create it is a mixture of audio from different recordings, especially if different channels are available. For example, using both a recording of someone from their landline and a second recording from their mobile phone will allow more accurate identification than if only one of these is used, especially if trying to match against a recording captured from the other channel.

8. Voiceprint Matching: When performing comparisons, the final step after creating the STATS file is to compare it against one or more stored model voiceprints. This may be done one at a time. First, the model is decompressed and directly compared against the test STATS to produce a differential. The results of the basic comparison are passed through two normalization processes. Both involve transforming the results into a standard normal distribution (mean 0, standard deviation 1). Since this step involves a predefined data set, it can be tweaked by changing the reference data, and this is considered to be typically more useful than modifying the UBM used in the earlier STATS creation step.

Z-normalization is performed, which involves comparing the model voiceprint against a set of existing voiceprints. T-normalization involves comparing the test voiceprint against a set of existing voiceprints. A Likelihood Ratio (LR), which is the final score for the test, is calculated by a logarithmic transformation. The result is a value between −16 and +16. The intention is that this is the base-10 logarithm of the ratio between the probability that the speaker in the test audio is the same as the speaker for the model audio and the probability that the two speakers are different. Hence a score of 3 is intended to mean that the speakers are 1000 (=$10^3$) times more likely to be identical than not.

For binary tests, where a yes/no answer to the question "are these the same speaker?" is desired, the final LR score is compared against a threshold. An example way to calculate a threshold for a given scenario is:

Let p be the probability that the test audio is from the same speaker as the model audio.
Let $C_{f+}$ be the 'cost' of a false positive (answering 'yes' incorrectly), and $C_{f-}$ be the cost of a false negative (answering 'no' incorrectly).
Then the threshold t is given by solving:

$$\log t = \log\left(\frac{1-p}{p}\right) + \log\left(\frac{C_{f+}}{C_{f-}}\right)$$

Voiceprint Management

Centralized servers may be used to host voiceprint models for multiple organizations and the voiceprint caching mechanism used by the biometrics system. Hosted voiceprint models is where biometrics voiceprint models are hosted on centralized servers for multiple organizations to use to detect people. e.g. fraudster or gangs of fraudsters voiceprint models are stored on centralized servers for multiple banks to use in fraud prevention. A voiceprint model caching scheme may be used by the biometrics framework 200 to cache the most recently used and often accessed voiceprint models. This provides both a performance improvement and also system resilience to network outages.

Functional Flow

The flow of calls through the analytics service 120 is controlled by 'Selection Rules' determine which calls should be processed, 'Analytics Rules' that determine which engines (202, 204) should process a call and contain parameters that tell the engine how to process it, and 'Actions' determine what should happen as a result of an Analytics Rule being matched. The Analytics Rules may specify, for example, a Keyword Spotting Analytics Rule that is a string that identifies the words to spot, and details of the precise combination of words (proximity, minimum confidence level, etc) that are considered to be a 'match'. Analytics Rules provide a Boolean result and it is assumed that a 'false' result is uninteresting. The Actions detail what externally visible effects should occur.

The basic processing flow is similar regardless of the provider 206, 207, 208, 210 or 212 or the engine 202, 204 involved. Each provider 206, 207, 208, 210 or 212 produces a stream of information about calls that can be analyzed, along with relevant metadata. Additionally, the provider supplies details of if and when a Selection Rule is matched. For example, as soon as a call starts, the provider 206, 207, 208, 210 or 212 begins sending an audio stream to the analytics service 120 for further processing. This stream is buffered until a Selection Rule that matches at least one engine's Analytics Rules is received for the call. The audio will only be buffered for a short length of time; if a Selection Rule match occurs later than this, audio will only be supplied to engine(s) from the time of the match onwards. This may only affect calls from the Real-Time Provider, as all other Providers provide the Selection Rules before or simultaneously with the call start.

When a Selection Rule match occurs, the analytics service 120 sends a start message to the relevant engine(s) for the call. Also, audio buffers are created for the engine(s) and decompressed audio starts to be written to them. If the provider 206, 207, 208, 210 or 212 produces any further tagging messages, these are forwarded onto all currently subscribed engines 202, 204 for the call. Further audio for each subscribed call is passed from the provider 206, 207, 208, 210 or 212, through the analytics service 120, which decompresses it, to any engines 202, 204 that are subscribed to it.

The audio stream to an engine 202, 204 stops when the stream ends naturally, the engine indicates that it no longer wishes to process the call, or when the engine's processing has completed (e.g. biometric voiceprints need only the first minute or two of the call). The engine 202, 204 passes any resulting Actions back to the analytics service 120. These are then passed to the provider or handled internally, as appropriate.

Selection Rules enable calls of interest to be identified. They are applied by a rules engine outside of the analytics service itself. The Provider sends a message to the analytics service whenever a Selection Rule is triggered, which identifies the Selection Rule. This enables the analytics service to match the Selection Rule to those that each engine has subscribed to, and so determine which engines want to handle the call.

Actions can be classified in two ways. First, Actions may be 'Configurable' or 'Intrinsic'. Configurable Actions are associated directly to specific Analytics Rules. Intrinsic Actions operate automatically regardless of the individual Analytics Rules. Any configuration designed to provide control over these is held within the engine's Role settings. Second, there are 'Generic' and 'Custom' Actions. Generic Actions are provided by the analytics service itself. Custom Actions are provided by a specific engine. In order to allow Actions to carry information related to the call being processed, the analytics service constructs a 'metadata dictionary' for each call. This dictionary typically contains entries for every available unique metadata tag (either from the XML metadata file or from the database record). Engines may augment this dictionary with extra items based on their processing. Actions can then use items from the metadata dictionary as part of their configuration. For example, to allow message strings to carry the call identifier and details of the analytics results. All Actions are triggered by an engine when an Analytics Rule is matched. Generic Actions are performed by sending a message from the engine to the Service with the details of the specific Action. Custom Actions are handled entirely within the engine.

In operation, within the biometrics framework 200, calls are pushed to the engines 202-204 based on a set of selection rules and a provider 206, 208, 210 or 212. A folder provider 208 provides audio and attributes from a pre-recorded file. A campaign provider 210 provides audio and attributes from pre-recorded files based on a campaign. A Real Time Provider 206 provides audio and attributes in real time from a capture engine. Future Providers 212 is a placeholder for any future provider implementation, as long as it provides audio data and attributes needed for biometric voiceprint detection.

Figure 3:
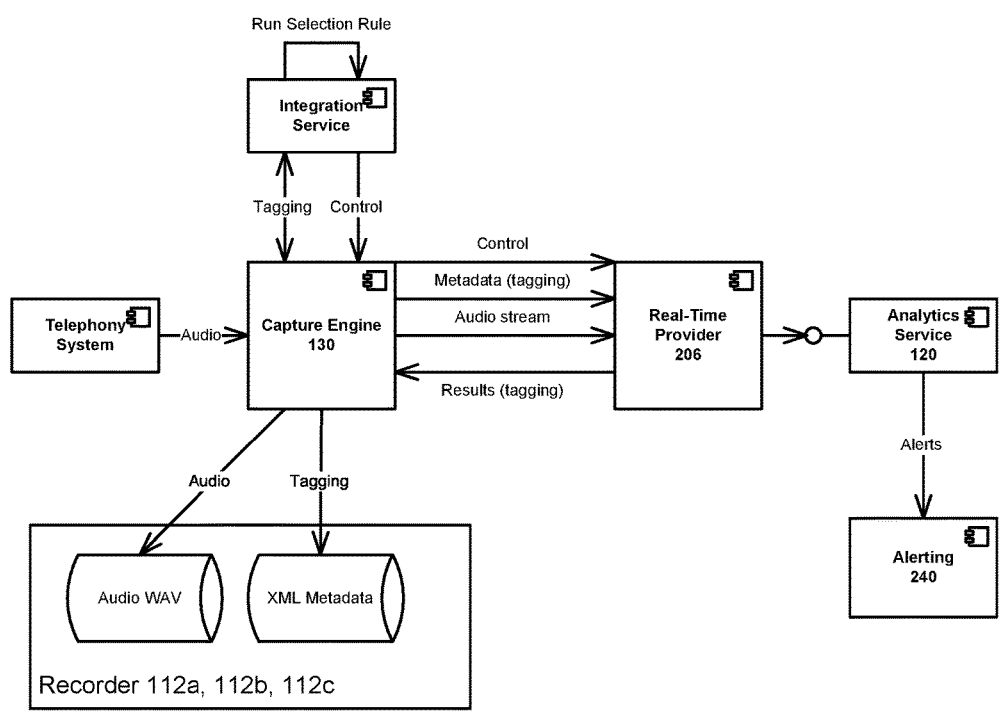
FIG. 3 illustrates details of creating voiceprints using a real-time provider of the biometrics framework of FIG. 2.

Example methods by which audio may be obtained by the framework 200 using one of the providers 206, 208 and 210 will now be described. FIG. 3 illustrates details of creating voiceprints using the real-time provider 206. In real-time processing, the basic requirement is that the audio is analyzed as it is recorded, with minimal delay. Selection rules can be processed by a rules engine, and the results communicated by the capture engine 130 to the analytics service 120. Audio is obtained by directly tapping the audio streams as they are recorded. Results can include new call metadata, for example messages can be tagged by the real-time provider 206 and sent to the capture engine 130, which will process them in the same way as any other tagging, including adding them to the XML metadata file. The capture engine 103 may subscribe to audio streams for recordings and pick up new tagging events. Both metadata and audio can be passed to the analytics service 120.

The decision as to whether to analyze a call is made using selection rules in and passed in control messages through the capture engine 130 to the real-time provider 206. These messages may indicate the selection rule(s) that was matched. The real-time provider 206 may also tags calls with an All Calls Selection Rule, which makes it easy to create analytics rules that are required to be run against every call, and also allows analytics to be used in systems, such as front-office trading systems.

The audio stream from the capture engine 130 may be a single mixed mono stream (e.g., TDM, some VoIP) or two unmixed mono streams (e.g., most VoIP). The real-time provider 206 merges the two unmixed mono streams into a single stereo stream before sending the audio to the analytics service 120. Alerts may be communicated to an alerting platform 240, such as a web service to raise alerts to users of the framework 200.

Figure 4:
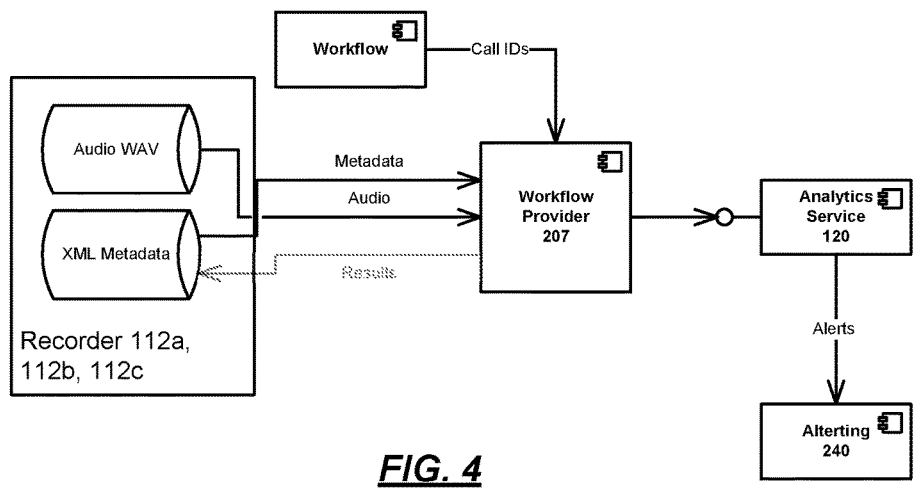
FIG. 4 illustrates details of creating voiceprints using a workflow provider of the biometrics framework of FIG. 2.

FIG. 4 illustrates details of creating voiceprints using the workflow provider 207. When installed on a recorder 112a, 112b or 112c, a workflow provides the workflow provider 207 with the IDs of calls that are on the buffer. Once a call ID is obtained, the workflow provider 207 can access the metadata and audio files on a call buffer, and pass these through the analytics service 120 to the engines 202, 204. Results from the engines 202, 204 can be added to an XML metadata file stored in the recorder 112a, 112b or 112c.

Workflow-based processing by the workflow provider 207 involves waiting for a call to finish, and then using a workflow framework to add the calls to a queue. The queue is persistent, so calls cannot be lost, and it also contains a watermark, which can be manipulated to provide access to any calls still on the recorder's call buffer. Such a workflow integration can be used for several purposes. For example, it may be used to apply analytics between the end of a recording and the consolidation to the database. In this mode, the analytics would be added to workflow as a step that is completed before the call is passed to a consolidator. The workflow provider 207 may also be used to apply analytics to a history of previous calls. This might be performed to test the analysis (and its configuration) against existing calls as part of the initial or ongoing configuration, to perform some special analysis against old calls (e.g. initial voiceprint generation for voice biometrics), or to re-analyze old calls based on newly discovered information. Any results intended to be added to the call metadata would need to be directly passed to the database.

In all cases, access to recorded data is the same. Metadata may be obtained by direct examination of the XML metadata file on the buffer, providing the tagging as a set of name/value pairs. Audio is obtained by reading the audio file from a call buffer. It should be noted that this audio may have been compressed from its original recorded format (most likely by the capture engine 130), e.g. G.711 audio may be compressed to G.723.1 5.3 kbps by default, which may affect the accuracy of analytics. Alerts may be communicated to an alerting platform 240, such as a web service to raise alerts to users of the framework 200.

Figure 5:
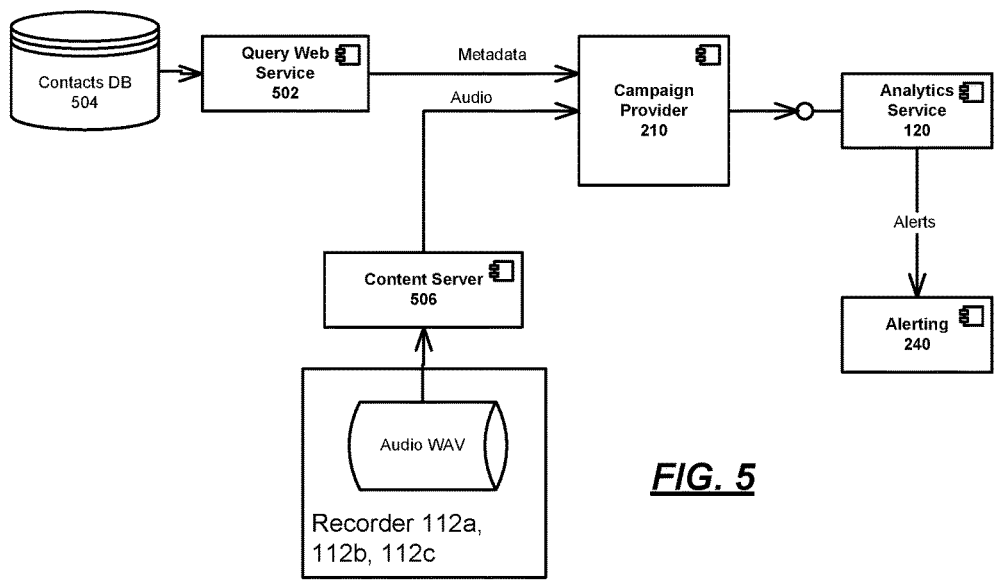
FIG. 5 illustrates details of creating voiceprints using the campaign provider of the biometrics framework of FIG. 2.

FIG. 5 illustrates details of creating voiceprints using the campaign provider 210. The campaign provider 210 uses a campaign, which is a form of pre-built database query (provided by a query web service 502), which intrinsically includes its own Selection Rules to obtain calls to analyze directly from a call database in the recorder 112a, 112b or 112c using information from a contacts database 504. The campaign provider 210 can obtain metadata from the database as part of its campaign query, and it can also use the metadata XML file as well (not shown in the diagram). It then obtains the audio file by asking Locator (not shown) and obtaining a URL to a Content Server 506. Following the URL allows the WAV file to be read. To avoid excessive reading of files across WANs, the campaign provider 210 can be configured to use location hinting in its retrieval requests. Audio files may be mixed mono or stereo, as discussed above.

The campaign provider 210 typically runs in a scheduled mode, periodically checking for new calls to process. It may also be manually triggered to run over the calls recorded during some time period. Campaign-based processing is unique in that, being database-based, it can see complete calls (sessions, or even contacts), ignoring their segmentation. It can also access calls that are no longer on the call buffer, but are instead on archive, which provides extra flexibility. Alerts may be communicated to an alerting platform 240, such as a web service to raise alerts to users of the framework 200.

Folder-based creation of voiceprints using the folder provider 208 may be used for, e.g., research, development, and testing is to simply read audio from files in a folder. The folder provider 208 may be configured to read audio from a folder in which the audio files can be found. The folder provider 208 then retrieves all WAV (or other formatted)

files in the folder, and reads them. Each folder may be treated as a different Selection Rule. Optionally, the folder provider 208 can be configured to also read metadata XML files in the same folder (e.g., matching them to the WAV files by just changing the file extension) and read the metadata name/value pairs. The folder provider 208 can also be set to simulate reading the audio data in real time. In this mode, each call is streamed at the same speed as the audio would be replayed.

After the providers 206, 207, 208, 210 and 212 obtain call data, the biometrics engine 202 passes audio and call attributes to the audio detection library 222 using the streaming daemon 216 for processing based on a selection rule and provider 206, 207, 208, 210 or 212. The biometric engine 202 will use stream associated attributes to select person models from a person database 220 when configured to do so for person verification. For example, the biometrics engine 202 may select all active voiceprint models for all people configured in an active blacklist group.

Biometric detection by the detection library 222 is passed back to the biometric engine 202 for tagging by the analytics service 120, either in XML files or some database, configurable notification (Email, Desktop popup, etc.). The biometric engine 202 may be able to trigger differing alerts details based on the same detection but different score ranges, as opposed to threshold of scores, e.g. low detection of fraudster=warning, whereas a high detection of fraudster=major alert. Biometric detection results may be stored in the person database 220 for analysis purposes.

Figure 6:
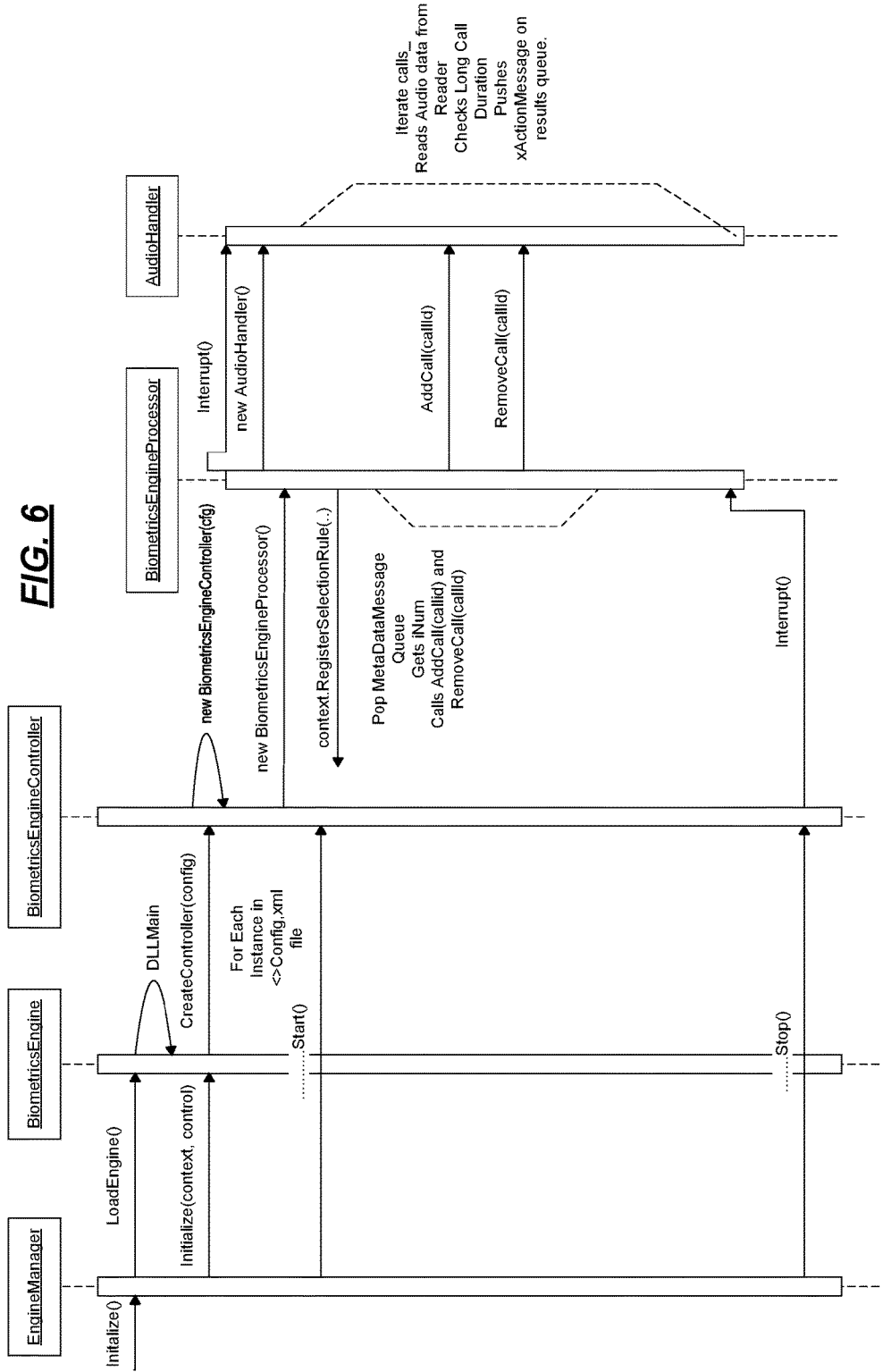
FIG. 6 illustrates a biometric/enrollment engine sequence diagram.

FIG. 6 illustrates a biometric/enrollment engine sequence diagram. The biometrics engine 202 starts a command port reader thread to read biometrics results and starts data port reader thread to read data require/not required request from the daemon 216. The biometrics engine 202 handles call event notifications sent from the analytics service 120 and maintains selection rules for each call notification. The biometrics engine 202 registers providers and selection rules with the daemon 218 and person database 220 so that biometric detection can be performed specific to blacklist and validation person groups.

The biometrics engine 202 initializes the daemon 216, including stream options and data port assignments. The biometrics engine 202 sends person criteria for person verification to the daemon 216 with, e.g., a configurable delay before stream processing is commenced. This allows for late arriving call attributes which might be needed in the selection of person validation to be accumulated. The biometrics engine 202 polls for audio call data and writes interleaved audio chunks to the kivox daemon. The biometrics engine 202 will register <SelectionRules> read from its configuration file. This is used by one of the providers 206, 207, 208, 210 or 212 to determine which calls to send to the biometrics engine 202. When the analytics service 120 sends call data to the biometrics engine 202, it sends back all selection rules so that the engine can determine which selection rule was used when providing the call.

Auto Enrollment

For auto enrollment, specific rules may be created and configured to be processed by the Enrollment engine 204 to exclude certain types, such as voice mail, conference calls, and other calls that do not provide adequate quality or length of audio containing the person for which the model is intended to be trained. People can be enrolled into the system either in real time as the calls occur or from a selection of historically recorded calls. The use cases below describe the automated processes of creating biometrics voiceprint models for people.

Agent Identification Verification—This use case describes where a person and agent are on a call and the agent confirms the identity of the person. This is typically done by the agent asking the person some questions via their Customer Verification Process. The persons portion of the audio is then used to create or enhance the persons voiceprint model. In this scenario, the agent will typically use a computer application to tag the person as verified, this in turn tags the audio call as being verified by the agent.

Key Word Spotting (KWS) Verification—This use case describes where the KWS system detects an agent asking and confirmation the persons id. The audio from this call is then uses to create or enhance the persons voiceprint model. Example of KWS phrase may be the agent saying 'Thank you, I have verified your account details'.

Audio Enrollment Confirmation—In this use case, a person who has been enrolled into the Biometric detection system will receive notification (e.g. email/phone call) containing details of a call they have previously made, requesting that they confirm that that had been on the call. The model created from the original call will then be positively weighted as good identification for the person.

IVR Enrollment—In this use case a person is instructed to be on a call with an IVR for enrollment purposes. The person's audio from this call is then used to create or enhance the persons voiceprint model.

Person enrollment opt out—This use case describes where a person opts-out of biometrics enrollment by notifying (calling, emailing, etc) an agent or IVR to have their biometrics voiceprint model removed from the system.

Rejecting incorrect number of speakers on call for enrollment—This use case describes where additional diariazation processing on potential audio for model creation/enhancement is used to determine number speakers on the call. If the number of speakers does not match the expected number as indicated by the call attributes, the call audio will be rejected from creating or enhancing the persons voiceprint model.

Figure 7:
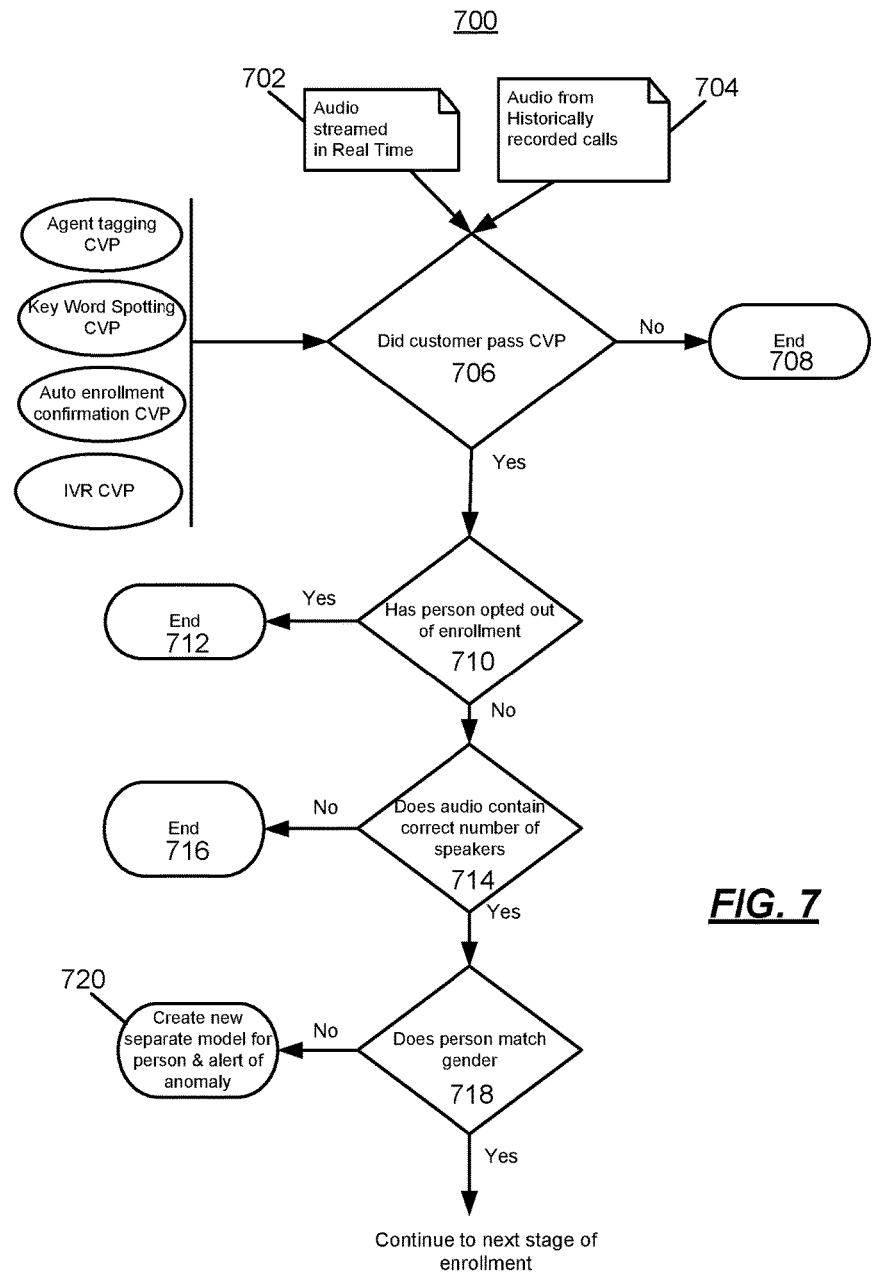
FIG. 7 is an example operational flow associated with gender identification in the biometrics framework of FIG. 2.

Gender identification—As shown in FIG. 7, there is an example operational flow 700 associated with the use case of gender identification. The operational flow describes an operation where the biometrics system gender identification feature is used to validate the person on a call against the persons stored gender details. If there is a mis-match the audio will be rejected for creation or enhancement of the person's voiceprint model.

At 702, call audio is streamed in real-time or, at 704, the call audio is streamed from historically recorded calls. At 706, it is determined if the caller passed the customer voice portal (CVP). If not, the operational flow ends at 708. If the caller did pass the CVP, then at 710, it is determined if the caller opted out of enrollment. If so, then the process ends at 712. Otherwise, the process continues at 714, where it is determined if the audio contains a correct number of speakers. If not, the process ends at 716. Otherwise, the process continues at 718, where it is determined if the person matches gender. If not, then at 720, a new model is created for the person and an alert generated for this anomaly. If the person matches gender, then at 718 processing may be passed on to a subsequent stage of an enrollment process.

First call audio model enrollment—In this use case, when the system detects that a person has never been on a call before (via call attributes) and uses the audio to create a person's model identified by the call attributes.

Figure 8:
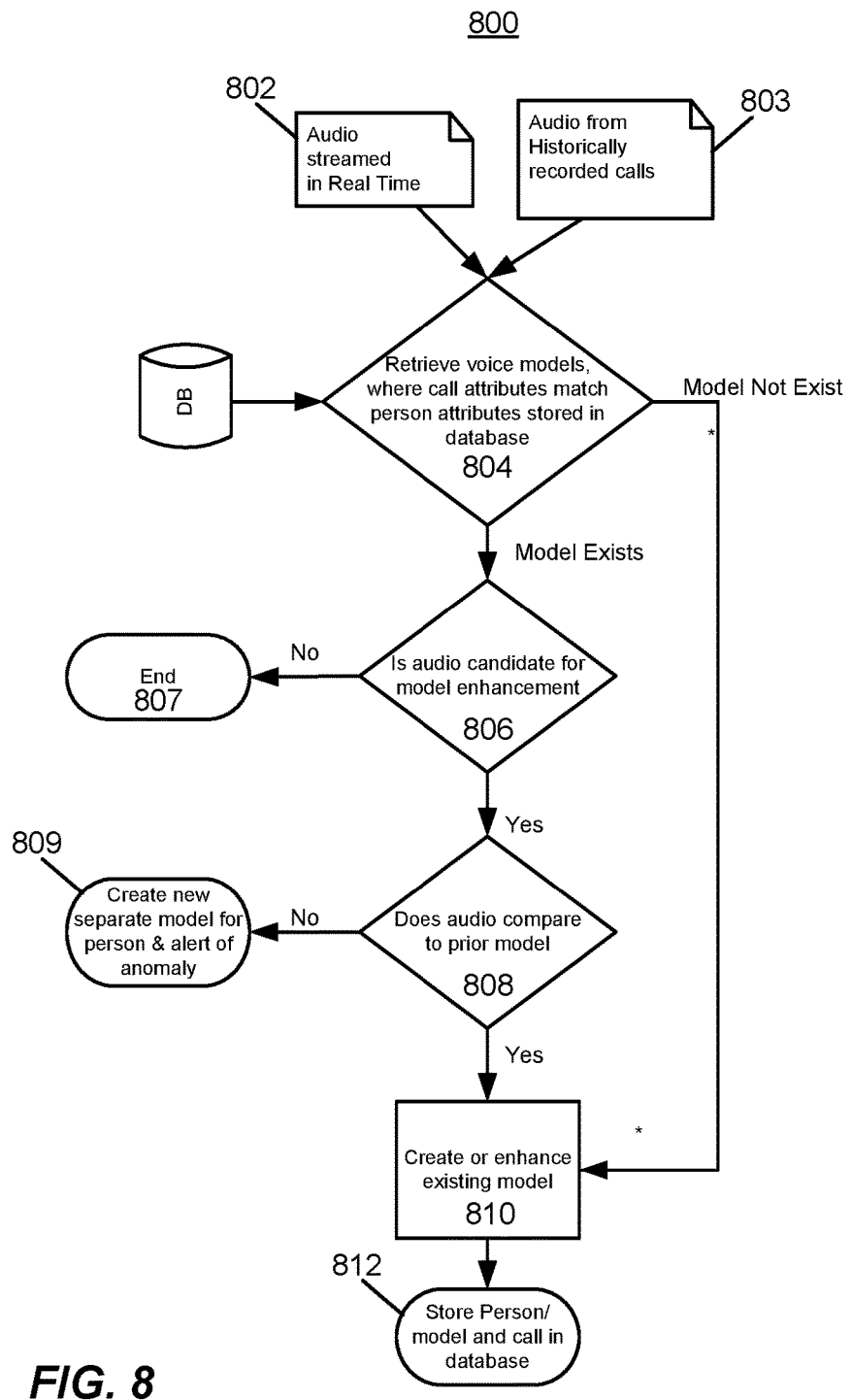
FIG. 8 is an example operational flow associated with comparing audio against prior models in the biometrics framework of FIG. 2.

Comparing call audio against prior models—As shown in FIG. 8, there is an example operational flow 800 associated with comparing audio against prior models. At 802, call audio is streamed in real-time or, at 803, the call audio is streamed from historically recorded calls. At 804, it is determined if a known person is on a call (e.g., using call attributes) matches voice models stored in the person database 220. For example, prior models created for that person may be compared with the new audio. If the audio does not exist, then the flow branches to 810, where a model is created. If the audio matches the existing model, then at 806 it is determined if the audio is candidate to enhance the person's model file model quality. If the audio is not a candidate, then processing ends at 807. Otherwise, a comparison is made at 808 to determine if the audio compares to a prior model. If not, then a new, separate model for the person created, and an alert is generated. If the audio does compare, then at 810, the audio is used to enhance the existing model. Then, at 820, the person model is stored in the person database 812.

An extension to this use case is to compare calls for a specific person configured over a specified period of time (days/weeks/months) apart. This is to reduce the chance of a fraudster attack where they are trying to compromise a voiceprint model using the authentic persons call attributes (Possibly there phone) over a short period of time. Extension to this use case is that if the audio does not match any prior model, the audio be used to create a new separate voiceprint model for the person. This information can then be used by the system to indicate that an anomaly has occurred. e.g., bank customer joint account owners using the same phone, potential fraudster attack, etc.

Figure 9:
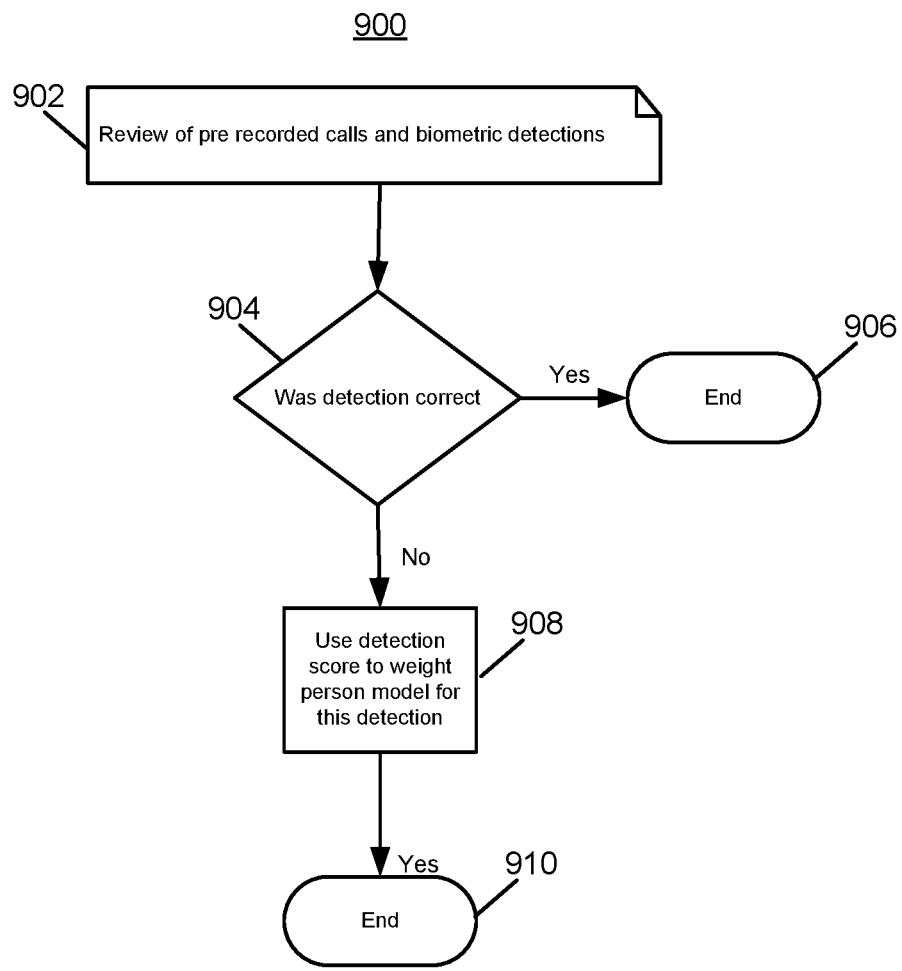
FIG. 9 is an example operational flow for user initiated voiceprint model quality feedback in the biometrics framework of FIG. 2.

User Initiated Voiceprint Model Quality Feedback—As shown in FIG. 9, there is an example operational flow 900 for user initiated voiceprint model quality feedback. At 902, pre-recorded calls and biometric detections are reviewed. At 904, it is determined if detection was correct. If yes, then the flow ends at 906. If the detection was incorrect, then at 908, the detection score is used to weight the person model for this detection. At 910, the process ends. This use case describes where a supervisor or security agent who reviews calls as their normal work function, will additionally flag a detected call as correct or incorrect. This user initiated flagging is then used to adjust the quality weighting associated with the person model. The persons model weighting is later used to determine what actions the system should take when a future detection is made for this person.

Auto Enrollment with Manual Approval

The use cases below describe the automate process of using audio to creating or enhance biometrics voiceprint models for people with a manual approval flow.

Auto enrollment with manual review—This use case describes where call audio is used to create or enhance a person's model audio based on the call attributes but placed into a pending approval state. A supervisor or security officer then manually reviews the call and flags it as approved for use accordingly.

When audio is enrolled and a person's voiceprint model is created, the vendor and version of the biometrics model management library 224 used to create the model is also stored in the person database 220 along with the newly generated model file. This vendor and version information may be used to perform model upgrades if the biometrics model management library 224 is upgraded and not backward compatible with earlier versions of the generated models.

For enrollment, the enrollment engine 204 generally subscribes to the campaign provider 210 running a campaign that identifies recordings that can reasonably be used to produce such voiceprints. Each call is processed to create a voiceprint, with the customer identified by appropriate metadata fields, and the voiceprint is then stored. If a voiceprint already exists for that person, then the existing voiceprint is augmented with the new data to produce a better voiceprint. When performing the initial voiceprint generation on a new system, it is preferable to ensure that the campaign does not provide excessive amounts of audio for each individual; therefore the number of calls per person should be limited. Also, short calls are generally not useful, so only calls likely to contain sufficient speech from the person whose voiceprint is being generate should be included. As a guideline, this implies having at least 90 seconds of audio for a call (in order to provide 30 seconds of useful audio for the voiceprint creation). A campaign may be left running after initial voiceprint generation in order to continue generating new voiceprints for new speakers, or to further augment existing voiceprints with data from new calls.

Enrollment can also be performed while subscribing to the real-time provider 206 for verification or identification purposes. The engine can be configured so that, if it can identify who the voiceprint should be stored against but there is no existing voiceprint to use, it will instead absorb the entire call, and then (if there is enough audio) generate and store a new voiceprint.

Below is a table that describes potential auto enrollment use cases detailing their assumptions and constraints. As noted above, a new person will typically be enrolled when any one of their call attributes are noticed for the first time. e.g. ANI, Extension, etc. This unique attribute used to enroll a new person will be referred to as the enrollment_id. A "gold model" is considered to have a more authoritative weight/value when a new person is discovered for auto enrollment.

| Use Case | Assumptions | Constraints/Issues |
| --- | --- | --- |
| A gold model is created using the first call from a newly discovered person. | The first person discovered that calls is authentic. | The first person discovered calling may not be authentic. Must be captured in stereo or know who the first speaker is on the call when using diarization. Mono audio diarization is not perfect. Multi voice audio (Corporate/Joint accounts) may be incorrectly used to generate model. |
| A gold model is created when a person calls into an IVR for enrollment purposes. | Stereo audio is captured or IVR timings may be used for enrolling from a mono audio. | Requires an active enrollment process. |
| A gold model is created when id verification attribute is present, tagged | When an agent confirms the Id of a customer via agent popups, an attribute | We may not receive an attribute verifying that the agent has positively id a person via agent popups. |

-continued

| Use Case | Assumptions | Constraints/Issues |
| --- | --- | --- |
| via the agent asking and confirming the persons id via agent popup attributes, | is also saved against the call. Maybe via DPA and via post recording trigger as validation will not occur until sometime into the call. | Must be capturing stereo or know who the first speaker is on the call when using diarization. Mono audio diarization is not perfect. Multi voice audio (Corporate/Joint accounts) may be incorrectly used to generate model. |
| A gold model is created when a person is automatically sent an email on file requesting permission there voiceprint be enrolled, stating time and date of call. | Email and ANI on record for person being enrolled is available. | Requires less obtrusive active enrollment process. Post call. |
| A gold model is created when KWS spots the agent asking and confirmation the person's id. | KWS is also installed and a rule setup so that audio is sent to the Enrollment engine when KWS detects person's id has been successfully verified. | Requires KWS to also be installed. Must be capturing stereo or know who the first speaker is on the call when using diarization. Mono audio diarization is no tperfect. Multi voice audio (Corporate/Joint accounts) may be incorrectly used to generate model. |
| Less accurate guessing methods if person authentic and methods reject known issues. | | |
| A gold model is created when two or more calls with the same call attributes detect the same voiceprint over a configured score threshold. | The person most frequently calling is authentic. | The person most frequently calling may not be authentic for multiple reasons, e.g. A fraudsters setting up a new account with someone else's details. Must be capturing stereo or know who the first speaker is on the call when using diarization. Mono audio diarization is not perfect. Multi voice audio (Corporate/Joint accounts) may be incorrectly used to generate model. |
| Run additional diariazation processing on potential model audio to determine number speakers to reject audio if it is determine that there is more than one speaker on a single channel. | The algorithm for determining the number of speakers is accurate. | This may be able to be used to reject any audio from enrollment where more than one speaker is detected on a single stereo channel or more than 2 speakers on a mono channel. E.g. Reject Joint account call with 2 customer speakers. |

Biometric Detection Use Cases

In accordance with the present disclosure, the biometrics framework 200 may perform various subtypes of biometric detection. A first type is person verification, which uses attributes associated with the stream being processed and attributes associated with a person in the database, to select voiceprint models for only those people whose attributes match. A second type is blacklist detection, which allows a user to configure a set of people and their associated voiceprint models, to be used when processing all audio streams.

Figure 10:
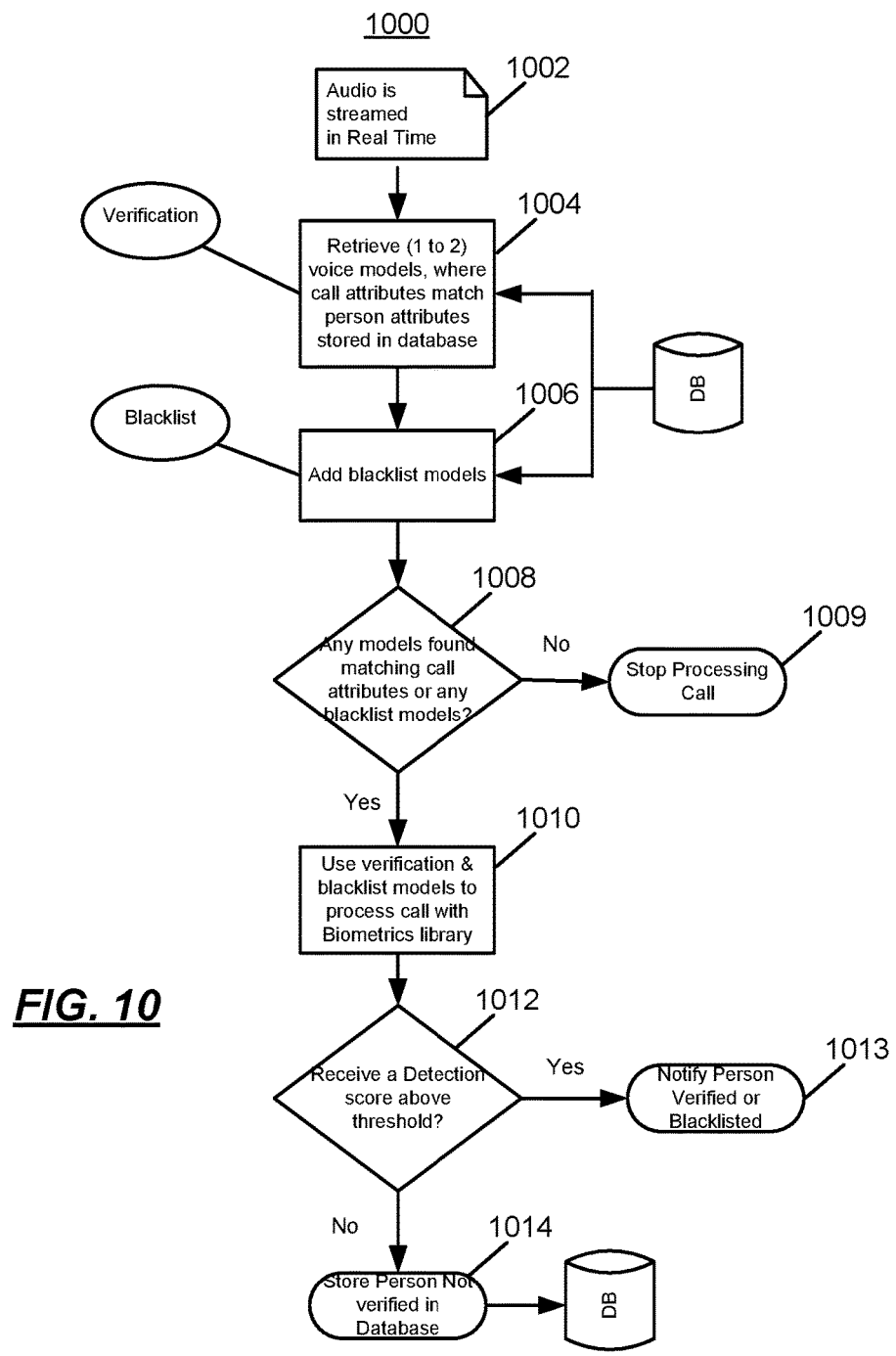
FIG. 10 illustrates an example operational flow for person verification and blacklist detection in the biometrics framework of FIG. 2.

FIG. 10 illustrates an example process 1000 for person verification and blacklist detection in the biometrics framework of FIG. 2. At 1002, audio is streamed in real-time. For example, the real-time provider 206 may stream audio in accordance with the operations shown in FIG. 3. At 1004, call processing may be initiated by the biometrics engine 202, where the person database 220 is read for all blacklisted people. At 1004, the blacklisted peoples' voiceprint models are added to the set of voiceprint models used in detection. The biometrics engine 202 may obtain attributes via the analytics service 120 'getTags( )' method in order to form the selection criteria in the PROCESSSTREAM command. The biometrics engine 202 will send a PROCESSSTREAM command with Add Model(person_selection_criteria) to the daemon 216.

At 1008, it is determined if any models found match call attributes or blacklisted modes. The daemon 218 will try to find a person matching person_selection_criteria, and if they have a voiceprint, the daemon 218 will add it (at 1010) to the list of voiceprint models to be detected. If there are no voiceprint models for either the active Blacklisted or Verification groups, the streaming daemon 216 notifies the biometrics engine 202 (at 1009) to stop sending audio data for the stream. At 1012, audio stream data will be processed with results sent back to the biometrics engine 202 determine if the detected confidence levels are above a threshold. If so, then at 1013 a notification is sent that the person was verified or blacklisted. If the confidence level is not above a threshold, then at 1014, the person who was not verified or blacklisted is stored in the person database 220.

Figure 11:
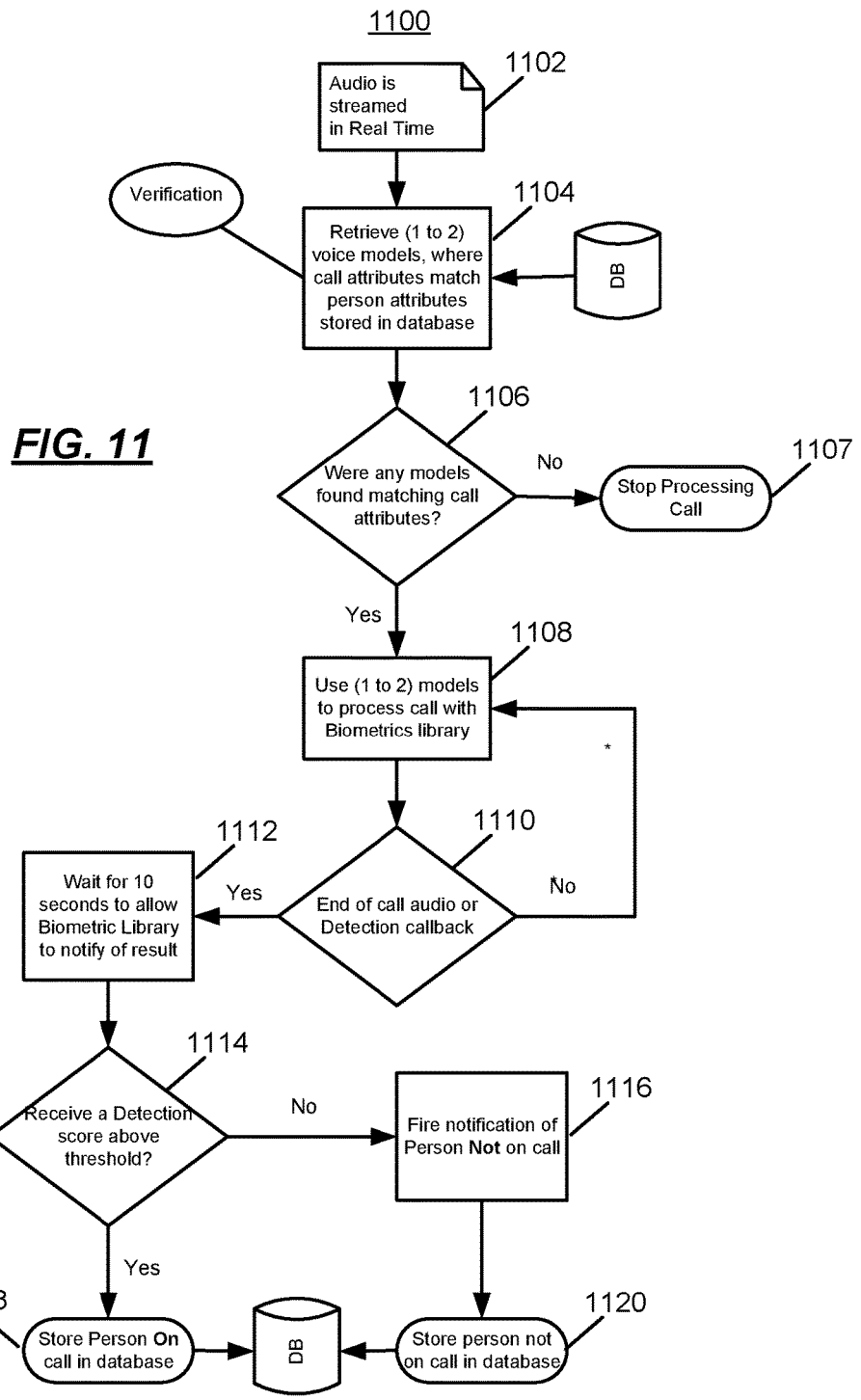
FIG. 11 illustrates an example operational flow wherein a person is not verified by the biometrics framework of FIG. 2

FIG. 11 illustrates an example operational flow 1100 wherein a person is not verified by the biometrics framework of FIG. 2. At 1102, audio is streamed in real-time. For example, the real-time provider 206 may stream audio in accordance with the operations shown in FIG. 3. At 1104, call processing may be initiated by the biometrics engine 202, where the person database 220 is read for all blacklisted people. At 1106, it is determined if any models found match call attributes. The daemon 218 will try to find a person matching person_selection_criteria, and if they have a voiceprint, the daemon 218 will add it (at 1108) to the list of voiceprint models to be detected. If there are no voiceprint models for either the active Blacklisted or Verification groups, the streaming daemon 216 notifies the biometrics engine 202 (at 1107) to stop sending audio data for the stream.

At 1108, an end of the call audio or detection of a callback is determined. If there is no end callback, processing loops back to 1108. If there is an end of the call audio or a callback is determined, then at 1112, a delay (of, e.g., 10 seconds) is initiated to allow the biometric library to notify a result. At 1114, it is determined if the detected confidence levels are above a threshold. If not, then at 1116, an alert is fired to indicate that a person is not on a call and that person is stored in the person database 220 at 1120. If, at 1114, the confidence levels are above a threshold, then at 1118 the person is stored in the person database 220.

Figure 12:
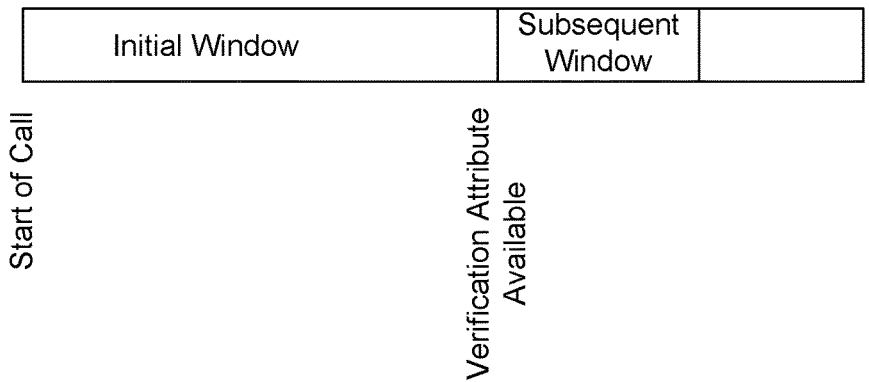
FIG. 12 illustrates audio windows, where the window size can differ throughout an audio stream.

In accordance with the above, the biometrics framework 200 may use post start of call attributes to perform person verification. At the start of a call where CVP is being used, a person's attributes may not be available. This results in the biometrics framework 200 not knowing what set of voiceprints to use at the start of the call for verification purposes. As shown in FIG. 12, to mitigate this issue, the biometrics framework 200 uses a method of comparing models against audio windows, where the window size can differ throughout the audio stream. If person attributes are not obtained by the system until, e.g., 30 seconds into the call, the biometrics framework 200 can be configured to use an initial window size of 30 seconds and then subsequent window sizes of 15 seconds, as shown in FIG. 10. This enables the system to select a person's voiceprint model for verification as soon as it receives the call attributes at 30 seconds. All audio up to 30 seconds into the audio stream is then used for verification against the selected person's model. Subsequent audio windows of 15 seconds can then be used when comparing the already known set of models for verification. This design results in verification of a person at the soonest possible moment in time using as many audio windows as are available.

Figure 13:
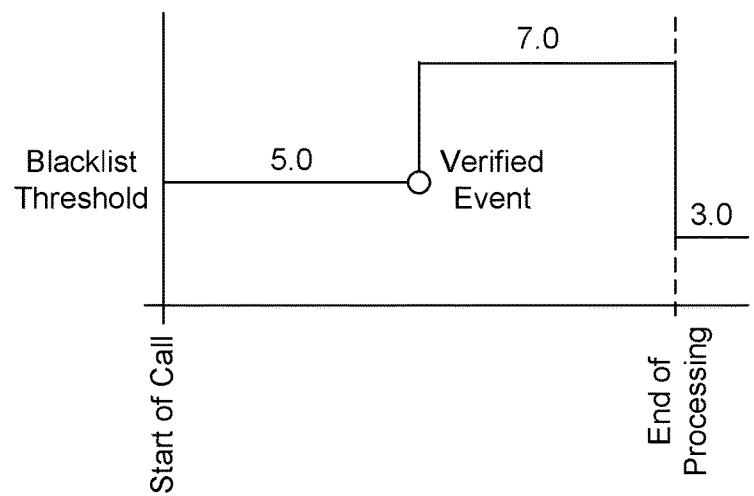
FIG. 13 shows that a notification may be weighted based on other biometric detections throughout a call.

Further, in accordance with some implementation, the biometrics framework 200 may improve notification accuracy using one biometric detection detail within a call to influence another biometric detection within the same call. The biometric detection results are represented as confidence level, the decision the biometrics framework 200 makes as to whether or not to fire a notification can be weighted by other biometric detections that occur for the same call. For example, if the biometrics framework 200 detected that person A in a fraudster list was detected with a confidence score of 3.0 and in addition the system detected person B as a valid customer with a confidence score of 6.0. The system may decide to weight the decision to not to fire a fraudster alert since it is more confident that it detected a valid customer. FIG. 13 shows how the decision to fire a notification may be weighted based on other biometric detections thought the call.

Use Cases of Voiceprint Biometrics

Below are presented several example use cases for voiceprint biometrics, once collected by the framework 200. Some of these could be augmented by additional voice biometrics such as gender and language identification.

1. Customer Verification

Voiceprint biometrics may be used to augment or replace the existing security processes used to verify a customer's identity. An example operational flow is as follows:

Customer rings in.
The system picks up who the customer is believed to be. This may be via various methods (or a mixture of these):
  Customer interacts with an IVR and provides identification information before being passed to an agent.
  Customer provides identification information verbally to the agent, and the system picks it up via some sort of integration (probably to the agent desktop).
  System identifies the customer using CTI data, such as caller ID details.
This identification information is used to find an existing voiceprint for the customer.
The speech occurring on the call is tapped and fed to the biometrics engine 202 (streamed in real-time) to be compared against the existing customer voiceprint, until one of the following occur:
  A successful match occurs.
  A failure to match occurs.
  A maximum time period is reached.
The results are fed to the agent via desktop integration, as well as tagged against the call metadata.
The action taken next may vary. Typically a successful match will allow the existing security procedures to be shortened or skipped, while any other result will cause the existing (or even enhanced) security procedures to be used.

Voiceprint biometrics provides enhancements to existing methods of customer authentication, such as reducing inconvenience to the customer, increasing customer satisfaction, faster handling of the call, and greater difficulty for a fraudster to impersonate a customer.

The biometrics engine 202 may also supply a gender identification function, which could be added to this process to produce a more rapid failure in those cases where the match will fail anyway. Also, if present, there may be cases where a language identification function could enhance the process by enabling the rejection of a match if the speaker uses an unexpected language, even if the voiceprint matches.

2. Agent and Trader Verification

This use case is similar to customer verification and is used in specific cases, such as when a contact center 104 is outsourced or agents are able to work remotely (e.g., home working scenarios). The goal is to verify that the person handling a call is genuinely the agent or trader that the system is expecting. A particular case of this may be encountered in environments outside the contact center 104, such as trading floors, where the traders ('agents') may be much less strict about logging off when they are not present, allowing someone else to 'impersonate' them from the recording system's perspective. The details are the same as for the customer verification case above, except that the results are likely to be either merely stored with the other call metadata, or flagged for attention from someone not on the call (a supervisor or a member of a security team).

3. Fraud Detection (Blacklist)

This use case aims to identify known fraudsters so that they can be prevented from successfully committing further fraud. The flow is as follows:

The system starts with a set of voiceprints for known fraudsters.
Every call has its customer audio (at minimum) passed through the biometrics engine.
The voiceprint created from the customer voice is compared against the previously stored fraudster voiceprints.

If a match occurs, then the system can take appropriate action, which may include:

Warning the agent via desktop integration. This should result in extra security checks (since the result may be a false positive), or maybe an automatic transfer to someone specifically employed to deal with suspect calls.

Flagging the call (in real-time) to a security person or team, who may monitor or intervene.

Flagging the call for later investigation. This would be most useful if the transactions that may be performed as a result of the call are not real-time and can be stopped if the call is proven to be fraudulent.

4. Speech Processing

Real-time speech processing, whether with a phonetic engine or a speech-to-text engine, can added to the biometrics framework 200. Both types of speech processing require the determination of the language being spoken in order to produce good results. Usually, this is known already; for example, a multilingual contact center 104 may have different external telephone numbers for different languages, or there may be an IVR step that determines the language. However, the biometrics engine 202 may supply a language identification function that could be used to replace or augment this.

5. CTI Replacement

An extension to the agent and customer identification use cases noted above is to use biometrics to replace the CTI information, or to correct it. A combination of voiceprint testing and detection of how the parties on a call identify themselves (via phonetic analysis and/or speech-to-text processing) is used to replace the need for CTI information completely, allowing the identities of the parties to be deduced without any CTI information. This is useful for situations where the recording platform 105 is not close to the telephony system, such as when recording is conducted as part of a central, hosted, telephony system shared between multiple end users, and thus may not have detailed information about the extensions and agents.

In traditional systems, this use case could replace the extensive configuration normally used to teach the recording platform 105 about all the agents, extensions, etc in advance, and the maintenance required to keep this information up-to-date as changes occur. This may be particularly useful in a hot-desking scenario where an extension may be used on different days, or even different shifts within a day, by multiple different agents. In these cases, it may often be possible to assume that information about the agent side of the call, at least, learnt from previous calls can be re-used, unless there are significant anomalies which indicate that this information needs to be updated. Finally, even if normal CTI information is available, this could enable some of it to be verified—particularly against unexpected changes (maybe caused by a failure to update the static configuration—such as when an agent moves desk, or is replaced by a new agent).

6. Credit Reference Checks

It is common practice for banks and financial institutions to carry out credit reference checks on their customers when selling financial services. Therefore an extension of the use of the voiceprint could be to pass these to an independent third party for validation in an attempt to prevent identity theft and other types of fraud. An example of a third party might be a credit bureau (e.g., Experian) which may hold voiceprints against its credit histories providing the ability to confirm identity. Alternatively, identity checks may be provided as an open service using the Software as a Service (SaaS) model, giving all companies access to identity verification regardless of the size of their existing customer base. Still further, individual consumers may be able to register their voiceprint with such services directly.

7. Gender Identification

The biometrics framework 200 may also provide gender identification. Even by itself, this may be of use in various types of statistical analysis. For example, being able to profile trends in customer gender by time of day, day of week, etc, may assist in providing better scheduling of agents to meet these needs; this may apply to any type of contact center 104, but perhaps particularly to those dealing with health or similar personal issues, where there may be a marked preference for customers to talk to an agent of the same gender.

8. Kiosk Biometrics

The biometrics framework 200 could also be used for situations involving face-to-face conversation. For example, at a bank counter where a customer is talking directly to a human bank teller. Tapping the conversation via a microphone (whether by utilizing the teller's existing telephone or computer, or using an extra microphone added specifically for this purpose) and running voice biometrics against the customer may assist with verification or identification in the same way that it does for telephone conversation. For identification, especially, it may further be used in conjunction with other technologies, such as facial biometric systems.

The use cases above lead to a series of general requirements. The incorporation of a biometrics framework 200 into the recording platform 105 entails several step. These include how to generate the initial voiceprints against which to compare future audio (enrollment). How and when to obtain the audio for a new call to pass to the voiceprint engine—and whether and how to restrict which calls are processed. What form the results take and how to ensure that they are sufficiently accurate.

To begin with, it is necessary to obtain sufficient audio for any given speaker to be then able to create a model voiceprint for future use. Thus, it is essential that this audio really does come from the identified speaker at part of the enrollment process. Even once a voiceprint has been created, it may also be useful to regenerate it as more calls involving the speaker become available over time, to increase the accuracy of the voiceprint. The files containing the voiceprints may be required to be encrypted; although they cannot be used to reconstruct any actual speech, they do constitute personally identifiable information that could be legally required to be subject to special security and privacy requirements.

The creation of voiceprint models for existing agents can be performed from either existing recordings, or new specially made recordings intended purely for this purpose. When new agents are added, they may either be asked to create a recording specifically to use for creation of a voiceprint, or the first calls they are involved in can be used. Generally, there is unlikely to be an issue in verifying that the audio used is genuinely from the given agent, so a purely automatic system would be sufficient if it is decided to use existing recordings.

The creation of voiceprint models for customers can again be based on existing historical recordings, or new specially made recordings designed for this purpose. For new customers (which include existing customers who have no existing recordings), the options are to obtain a special recording or to use the first recording when it becomes available. In this case, it is expected that obtaining special recordings purely for the purpose of generating a voiceprint will be difficult, or even impossible. This means that the use of historical recordings is much more important than for agent enrollment. It is also important that it can be verified that the audio used really is from the correct customer. The large number of customers means that it is unlikely to be viable to expect manual intervention to pick audio to use, so it will be necessary to allow recordings to be filtered to eliminate any that might not be authentic, and/or have tools that could help with identifying incorrect voiceprints. Additionally, comparison of individual voiceprints created from different calls that are believed to be from the same customer could be employed in order to identify if any of the calls might not actually involve the same customer, so that these calls can be eliminated before the final model is created.

There are different types of results that can be provided, depending upon the use case. The simplest type of result is a binary yes/no (or maybe a ternary yes/no/not sure). This type of result is good for scenarios involving verification. The biometric engine 202 may provide a numeric score of some form. In any specific case, this can be turned into a binary answer by comparing the score with a threshold such that scores above the threshold give "Yes", scores below give "No". (Or two thresholds, with scores in between them giving "Not Sure".)

When trying to match a voice sample against a list of voiceprints, the framework 200 may answer with one of the voiceprints, with the optional additional possibility of a "None" as an answer. Choosing a specific voiceprint can be performed by looking for the highest score, without any other calibration. However, it is likely to be rare that "None" would not be a valid answer, and so some sort of threshold will be needed to decide when "None" should be returned. Setting this threshold is affected by essentially the same factors as setting a threshold for a binary result.

Another form of result is to use the numeric biometric results to re-order a large list of calls. If there are a lot of calls with only a few genuine matches, then merely randomly sampling the calls searching for a match would be extremely unlikely to find anything (even assuming that a human listener can identify the fraudster if they hear them with a high level of accuracy), because the quantity of audio means that only a small percentage can be sampled. However, if the calls are ordered by a biometric score, it will be possible to target such a search onto the highest-scoring matches and dramatically increase the probability of catching the genuine matches.

Many of the above voice biometrics use cases target the issue of identifying one or more of the parties participating in a voice recording. This can be extended to a generic system for this problem that can take a multitude of different forms of input, assign weightings, and produce final results; whether that be a yes/no/not sure answer to a verification problem or a list of answers (with confidence scores or similar) to an identification problem. With or without voice biometrics, such a system could have value. Inputs to such a system could include call metadata, which contains the numbers of the phones at either end of the call. These may well indicate who the speakers are expected to be. From voice biometrics or a phonetic analysis language identification may be an identification, which could help to identify a speaker. From voice biometrics, gender identification or speaker identification could be an input. From a textual transcription, the name given by the speaker (especially for the agent), or vocabulary or phrasing used by the speaker (dialect, verbal tics) may be input. From a phonetic analysis, pronunciation characteristics (such as an accent) may be input.

Example Computing Device

Figure 14:
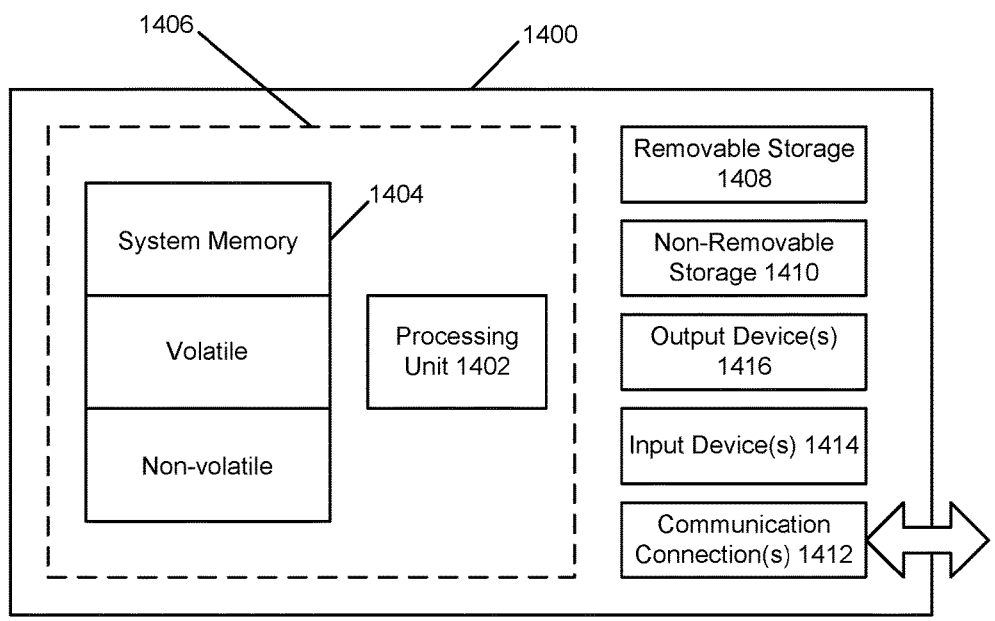
FIG. 14 illustrates an example system for implementing aspects of the present disclosure.

With reference to FIG. 14, there is illustrated another example system 1400 for implementing aspects of the present disclosure. In its most basic configuration, the system 1400 may be a general purpose computing device, such as a desktop, a notebook, a workstation or the like and typically includes at least one processing unit 1402 and memory 1404. Depending on the exact configuration and type of computing device, memory 1404 may be volatile (such as random access memory (RAM)), non-volatile (such as read-only memory (ROM), flash memory, etc.), or some combination of the two. This most basic configuration is illustrated in FIG. 14 by dashed line 1406.

The system 1400 may have additional features/functionality. For example, the system 1400 may include additional storage (removable and/or non-removable) including, but not limited to, magnetic or optical disks or tape. Such additional storage is illustrated in FIG. 14 by removable storage 1408 and non-removable storage 1410.

The system 1400 typically includes a variety of computer readable media. Computer readable media can be any available media that can be accessed by the system 1400 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 1404, removable storage 1408, and non-removable storage 1410 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the system 1400. Any such computer storage media may be part of the system 1400.

The system 1400 may also contain communications connection(s) 1412 that allow the device to communicate with other devices. Communications connection(s) 1412 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

The system 1400 may also have input device(s) 1414 such as keyboard, mouse, pen, voice input device, touch input device, etc. Output device(s) 1416 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described previously. Rather, the specific features and acts described previously are disclosed as example forms of implementing the claims.

What is claimed:

1. A method for verification and blacklist detection in a biometrics framework that includes an analytics service that supplies audio streams to a detection library in accordance with configured rules, comprising:
   interleaving, by a biometrics engine, audio information from multiple sources associated with multiple individuals into single stream real-time audio data;
   receiving the real-time audio data at a streaming daemon that accesses a database to retrieve blacklist voiceprint models about blacklisted individuals;
   adding the blacklist voiceprint models associated to voiceprint models in a detection library;
   determining, in real-time, if any of the voiceprint models or blacklist voice models match attributes associated with the audio information contained in the real-time audio data and, if so, processing the real-time audio data to determine if a confidence level associated with the match is above a threshold; and
   if the confidence level is above the threshold, sending a notification that an individual associated with the audio information was verified or blacklisted, or
   if the detected confidence level is below the threshold, storing a voice print created from the audio information associated with the individual in the database.

2. The method of claim 1, further comprising performing voiceprint detection on the audio information using a speaker model associated with unique characteristics of an individual's voice and a language model associated with linguistic characteristics.

3. The method of claim 1, further comprising determining the confidence level by comparing, using the biometrics engine, a likelihood ratio that is calculated in accordance with a logarithmic transformation of the comparison of the audio information associated with the individual with the voiceprint models or blacklist voice models.

4. The method of claim 1, further comprising:
   creating voiceprints by the biometrics engine by analyzing the audio information associated with the individual to extract features of the speech that are normalized into a base voiceprint that includes a speaker-specific portion.

5. The method of claim 4, wherein the voiceprints include features that are extracted from an audio signal associated with the communication, wherein the features include cadence, tone, rate of speech, or spectral characteristics.

6. The method of claim 4, further comprising processing the audio information by an enrollment engine in order to uniquely identify the individual.

7. The method of claim 6, further comprising providing a model daemon that receives enrollment commands and data from the enrollment engine to either insert or update a person and their attributes in the database.

8. The method of claim 4, further comprising electronically storing person and attribute details with each voiceprint in the database.

9. The method of claim 8, further comprising electronically storing at least one of name, telephone number(s), gender, language(s) spoken and specific identifying information as the attribute details.

10. The method of claim 1, further comprising:
    tagging the audio information using a capture engine to include additional information; and
    creating a call detail record containing the audio information.

11. The method of claim 10, further comprising providing a search facility that is used to search for predetermined communications using information in the call detail record.

12. The method of claim 1, wherein the streaming daemon receives biometric detection commands and data to select a person model from the database.

13. The method of claim 12, further comprising auto-enrolling person details and associated attributes into the database by the streaming daemon.

14. The method of claim 1, further comprising exposing interfaces of the detection library using application programming interfaces (APIs) to provide for querying, creating, updating and deleting voiceprints in the database.

* * * * *